May 5, 1970    R. BECKER ET AL    3,510,848
NUMERICAL READ-OUT SYSTEM FOR A MOVING BODY
Filed May 1, 1967    5 Sheets-Sheet 1

RAYMOND BECKER
GUY H. LACAN

KARL W. FLOCKS
ATTORNEY

RAYMOND BECKER
GUY HLACAN

KARL W. FLOCKS
ATTORNEY

May 5, 1970     R. BECKER ET AL     3,510,848

NUMERICAL READ-OUT SYSTEM FOR A MOVING BODY

Filed May 1, 1967     5 Sheets-Sheet 4

RAYMOND BECKER
GUY HLACAN

KARL W. FLOCKS
ATTORNEY

May 5, 1970 R. BECKER ET AL 3,510,848
NUMERICAL READ-OUT SYSTEM FOR A MOVING BODY
Filed May 1, 1967 5 Sheets-Sheet 5

RAYMOND BECKER
GUY LACAN
KARL W. FLOCKS
ATTORNEY

United States Patent Office 3,510,848
Patented May 5, 1970

3,510,848
NUMERICAL READ-OUT SYSTEM
FOR A MOVING BODY
Raymond Becker, Montreuil, and Guy H. Lacan,
Carrieres-sous-Bois, France, assignors to La Tele-
mecanique Electrique, Nanterre, Hauts-de-Seine,
France, a joint-stock company of France
Filed May 1, 1967, Ser. No. 635,000
Claims priority, application France, May 6, 1966,
60,675; Sept. 30, 1966, 78,431
Int. Cl. G11c 23/00; G09f 9/40
U.S. Cl. 340—173
14 Claims

ABSTRACT OF THE DISCLOSURE

Numerical read-out system for a moving body comprising several mechanical memory devices placed side by side, a reading station and a recording station, without material contact, which is characterized in that each mechanical memory device is constituted by a block hollowed out into a conduit including two downwardly directed branches, each branch forming a receptacle for a movable mass capable of being transferred into the one or other branch, the immobilization of the mass in one branch or the other corresponding to a stable position to which is attributed a binary numerical significance.

---

The present invention has for its object a numerical read-out system for a moving body.

Read-out systems for conveyors are known, in which each movable receptacle is provided with flaps which, when they are folded back according to a certain combination, define a code, and the position of the flaps, folded back or not, are read at the receiving points by proximity detectors. Such flaps may also interrupt a system of photoelectric reading devices.

It is known that there also exist systems in which the code carriers are constituted by movable magnetic bars or movable flaps which present certain magnetic polarities. The devices which operate on the detectors by magnetic polarities have the disadvantage of operating only at a very short distance thus necessitating small air-gaps. The devices which operate merely by the presence of a magnetizable body or those which intercept a luminous ray are therefore preferable since they may be made to pass at a distance from a reading device without requiring accuracy in the spacing between the reading device and the magnetizable body or ray interceptor. However, there is still another disadvantage. The swinging or rotating flaps are mechanical members which catch dust and become clogged in the vicinity of the paths of the conveyors which are always well oiled.

When the flaps are disconnected at the start of an automatic read-out system, it is necessary to have a group of electromagnets capable of acting with great force, and therefore they are heavy and costly. It is also necessary, upon the arrival of the receptacles, to reset the flaps to zero, which may not be compatible with the rough construction and the rapid advance of certain types of conveyors. The invention overcomes these disadvantages.

The present invention has for an object a numerical read-out system which utilizes body elements having two stable positions without hinges or mechanical parts subject to clogging and dust. These elements necessitate very little energy to position them. Furthermore, it has for an object a system of this kind in which the recording changes may be effected without material contact between the control device and the said system. It has finally for an object a numerical read-out system with mechanical positions which may be read at the operating points both by proximity switch devices and photoelectric cells and which are visually verifiable during movement of the conveyor.

A numerical read-out system for a moving body according to the invention comprises several mechanical memory devices each constituted by a block hollowed out with a conduit therein, said conduit having two downwardly directed branches. A movable body capable of rolling, which circulates in this conduit, may remain in a stable position in one or the other branch. A binary significance is attributed to each stable position that the movable body can assume. Thus the presence of the movable body in one branch or the other branch of the memory device may be considered as indicative of the storage of a binary "1" or "0," respectively.

The movable body is placed into one of the branches of the conduit by a control device. In a preferred embodiment, the movable body is attracted by the action of a magnet outside the memory device. A rack mounted motor moves an arm carrying the magnet from above one downwardly directing branch to above the other branch. An electromagnet retains the arm in proximity to the memory device during the movement of the arm to one of the two positions. The arm withdraws and the movable body is released to fall into the chosen position upon deenergization of the electromagnet.

The memory devices constituting a numerical read-out system for a moving body are disposed in side-by-side relationship on a conveyor which moves parallel to a row of position sensing devices. The hollow blocks are made of transparent plastic material and the position of the movable body may be sensed by its interception of a luminous ray normally detected by a photoelectric cell, or sensed by a proximity detector.

Another embodiment of each mechanical block or memory device of the group of memory devices constituting the read-out system according to the invention provides even more accurate operation and eliminates certain mechanical parts at an appreciable reduction in the cost price of the unit and the elimination of various assembly complications.

In this embodiment, the inner conduit of each mechanical block or memory device has the shape of an inverted V, each branch of the V constituting an incline terminating in a pocket to receive the movable body which is capable of being transferred into one or the other incline by passing over the ridge separating the two inclines. The inverted V conduit rests on one side so that one of the branches or inclines is longer than the other. Recording is realized by an electromagnet for each elementary conduit, this electromagnet being placed above the device between the ridge and the upper part of the second incline. The resetting to zero of the coded system is effected by means of a magnet placed above the device, adjacent to the top of the first incline.

The movable mass or rolling body may be a ball or, alternatively, may be a hollow cylinder recessed in the middle part of its outer surface so as to rest solely by its ends on the profile of the conduit.

The invention also comprises a device with a stabilizing support at each recording station and at each reading station.

Other characteristics and advantages of the present invention will become apparent from the following description with reference to the accompanying drawings, in which.

Figure 1:
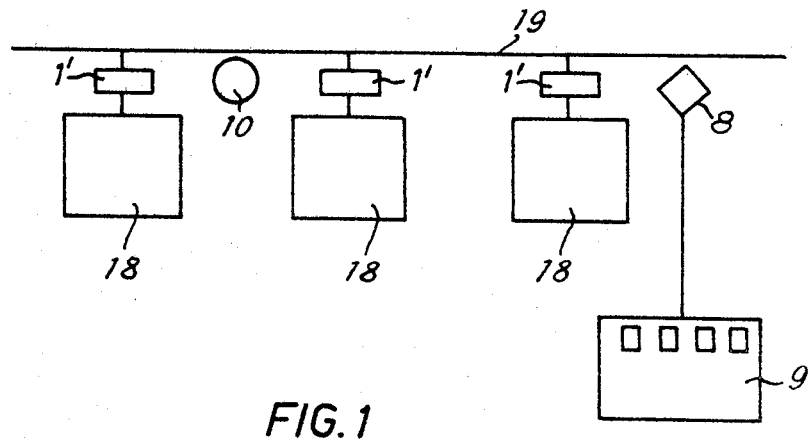
FIG. 1 shows the diagram of an installation comprising a numerical read-out system according to the invention.

In the block diagram of FIG. 1, line 19 represents a conveyor carrying loads or articles from left to right. Each of the loads 18 possesses a numerical read-out system 1' movable with it. Located at a first position in the line of travel of the read-out systems 1' is a control station 10 which may be actuated to modify the numerical content of the read-out system 1'. A sensing device 8 is located at a second position adjacent the line of travel of the numerical read-out systems 1'. The sensing device detects the numerical content of the read-out devices 1' and transmits that information to the display, numbering and control console 9.

Figure 2:
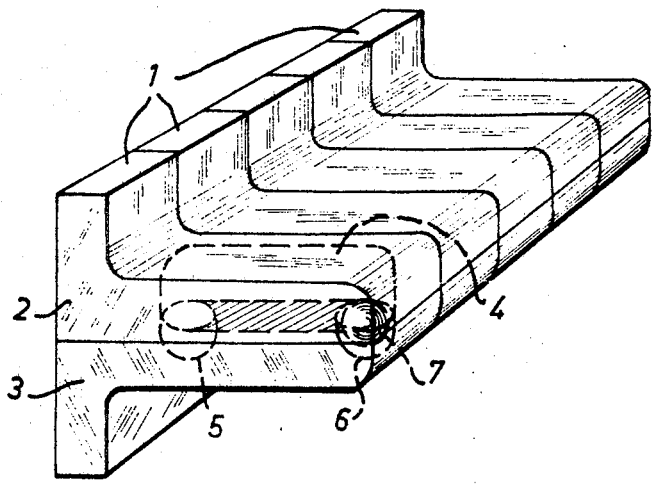
FIG. 2 is a view in perspective of several memory devices placed side-by-side.

In the embodiment of FIG. 2, the read-out system for moving bodies 1' comprises a succession of elements or blocks 1 placed side-by-side. Each of these elements constitutes a mechanical memory device consisting of a transparent water-tight case in two parts 2 and 3. Once joined together, these two parts define an inner horizontal conduit 4 terminated at each end by a vertical hole, hollow, notch or cavity 5 and 6. A metallic ball 7 may circulate in the conduit 4 and be received in one or the other of the cavities 5 and 6, each constituting a stable position for this ball. The presence of the ball 7 in the front cavity 6 may be read by a reading device 8 which does not make material contact and which transmits an identification signal to a display, numbering and control console 9 of FIG. 1.

Figure 3:
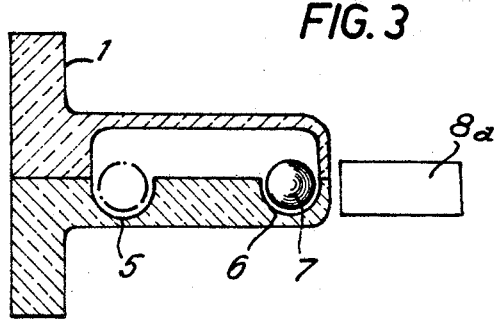
FIG. 3 shows, in partial section, one of said devices in front of a reading device.

In the embodiment of FIG. 3, this reading device 8 is constituted by a proximity detector 8a of the magnetic type. Alternately, the device may be a photo-electric cell detector. Each reading station includes as many detectors as there are memory devices 1.

Figure 4:
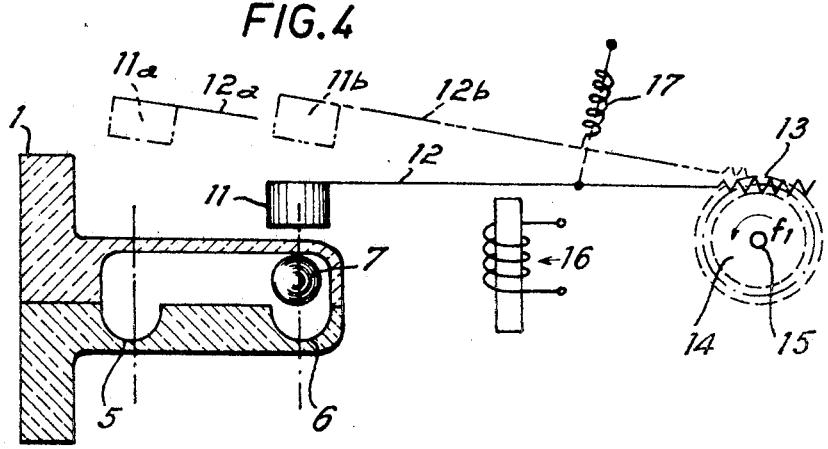
FIG. 4 shows, also in partial section, one of said devices in the presence of a recording device.

In the embodiment shown in FIG. 4, the control station 10 consists of a permanent magnet 11 carried at the end of an arm 12 having a rack 13 at its opposite end. This rack 13 is moved by a pinion 14 keyed to the shaft 15 of a driving motor. Thus, the arm 12 is capable of a forward or backward movement according to the direction of the motor. The arm 12 may be subjected, moreover, to a clearing movement imposed by an electromagnet 16.

Figure 5:
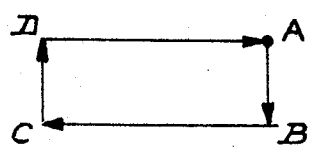
FIGS. 5 and 6 are sketches showing the movement of a magnet.

Due to these two movements, whether or not they are combined, it is possible to easily move the ball 7 in conduit 4 and deposit it in one or the other of the cavities 5 and 6. In FIG. 4, the representation in full lines of the arm 12 shows this arm lowered over memory device 1, straight above cavity 6, so that the ball 7 is attracted upwardly by the magnetic field of magnet 11. From this moment a translation motion of the ball to a point above the other cavity 5 may take place by operation of the motor in the direction of the arrow $f_1$. The ball may be left in cavity 5 by interrupting the excitation of the electromagnet 16, which results in the movement of arm 12 under the action of a return spring 17 to a position shown by dot and dash lines 11a, 12a. Further movement to the position shown by dot and dash lines 11b and 12b may be accomplished by motor reversal. The permanent magnet 11 has, in this case, performed the cycle ABCDA of FIG. 5.

Figure 6:
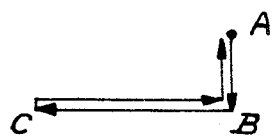
Figure 7:
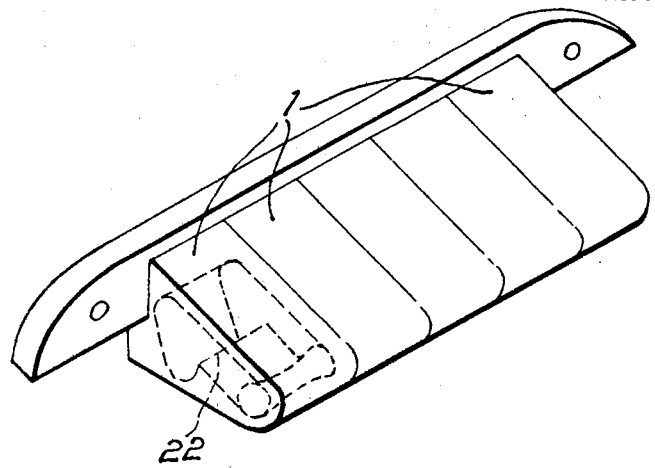
FIG. 7 is a view in perspective of several memory devices placed side-by-side constituting another embodiment of the invention.
Figure 8:
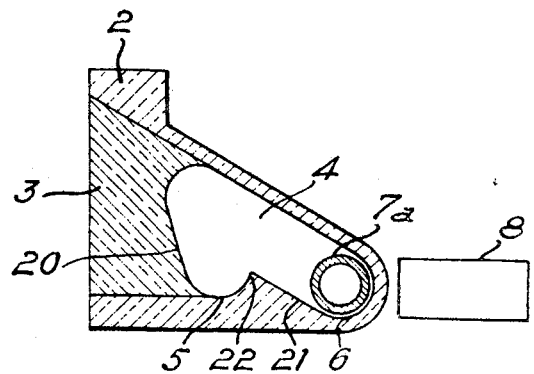
FIG. 8 shows, in partial section, one of these devices in front of a reading device.

If it is desired to maintain the ball 7 in the cavity 6, the magnet 11 travels through the cycle ABCBA of FIG. 6. Thus, the ball 7 undergoes a movement of translation above the cavities and then returns to cavity 6.

A visual verification of the change in the recording may be effected due to the transparency of the elements 1. The change occurs when the conveyor carrying the read-out system constituted by the memory devices 1, is in the arrested position. It is, however, possible to imagine a change while the group of memory devices are moving. It is possible to impose mechanically on the recording device a movement of translation parallel to the advance of the moving bodies with automatic recall of said device after the recording operation.

In the embodiment shown in FIGS. 7 to 13, the read-out system for moving bodies according to the invention also comprises a succession of blocks 1 placed side-by-side. Each of these blocks constitutes a mechanical memory device comprising a transparent water-tight case in two parts 2 and 3. These parts, once united, define an inner conduit 4 in the shape of an inverted V, resting on one side and the branches of which constitute two inclines 20 and 21 sloping downwardly. The incline 21 is longer that the incline 20, starting from the same origin which is the apex of the V. Each incline ends in a pocket or cavity 5 or 6 and a ridge 22 separates the two pockets.

A metallic cylinder 7a may circulate between the two inclines and be received in one or the other of the pockets 5 and 6 each constituting, for this cylinder, a stable position. The presence of the cylinder 7a in the front pocket 6 may be read by the reading device 8, without material contact, which then transmits an identification signal to the display, numbering and control console. Each reading station comprises as many reading devices as there are memory devices 1.

Figure 11:
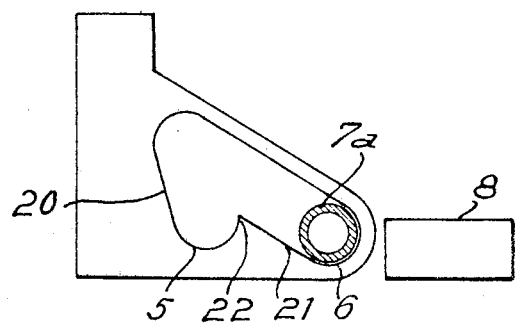

The recording changes may be accomplished by means of the control station for the memory devices. It permits placing at will the cylinder 7a of each memory device 1, in the cavity 5 or the cavity 6. This device comprises, in the embodiment shown in FIG. 10, an electromagnet 23 which, when it is excited and as a result of its position above the memory device, permits the cylinder 7a which is in the pocket 5 (FIG. 9) to jump over the ridge 22 (FIG. 10) and to pass by gravity, upon interruption of the excitation of the electromagnet, into pocket 6 (FIG. 11). The position of the electromagnet above the memory device is preferably situated between the ridge 22 and the upper part of the incline 21.

Figure 9:
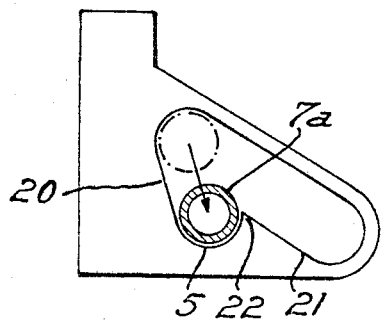
FIGS. 9 to 12 show, also in partial section, one of these devices in several operational phases.
Figure 10:
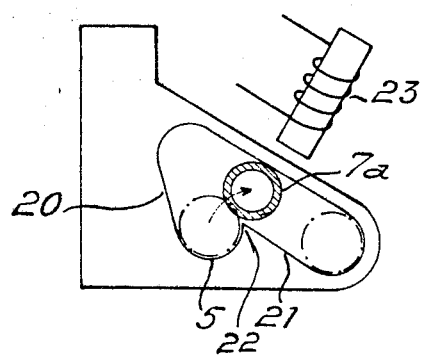
Figure 12:
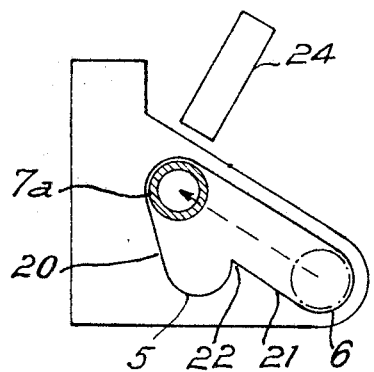
Figure 13:
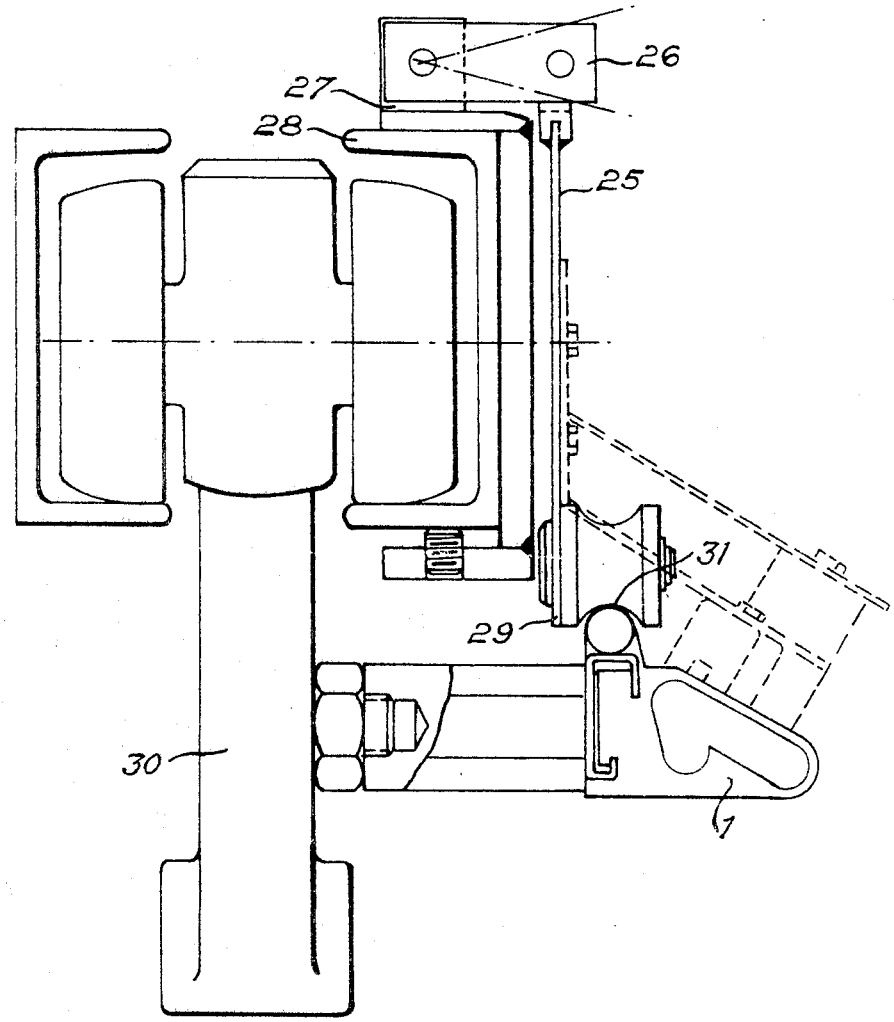
FIG. 13 shows, in end view, a device with a stabilizing support.

The numerical read-out system is reset to zero by means of a permanent magnet 24 placed straight above the point of origin of the inclines (FIG. 12). A cylinder which was in the pocket 6 of a memory device (FIG. 11), when strongly attracted by the magnet 24, leaves this pocket to reach the point of origin of the inclines (FIG. 12). When as a result of the movement of the movable body carrying the memory devices 1, the cylinder 7a is no longer under the influence of the magnet 24, it falls by gravity into the pocket 5 of the memory device (FIG. 9).

Each cylinder 7a may be hollow or recessed on its side surface so as to rest on its ends only on the profile of the inclines.

A device with a stabilizing support (FIG. 13) is provided at each control station and at each reading station of the memory devices. This device includes a metallic plate 25 hinged on a small link 26, itself pivoting on a fixed part 27 of the conveyor 28. The metallic plate 25 carries two positioning rollers 29 (only one shown) and either the control device 23 of FIG. 10 or the device 8 of FIG. 11 for reading the memory devices which is represented in dot and dash lines in FIG. 13. For its part, the numerical read-out system consisting of the memory devices is fixed on the movable part of the conveyor, for example, on a small balance 30.

The group of memory devices 1' composing the read-out system itself carries a double incline for engagement with the rollers 29. This double include presents a first incline, a horizontal portion 31 and a second incline. In accordance with this arrangement, the engagement of the double incline with the rollers permits the raising of the plate 25 and causes it to undergo a small angular separation so as to be positioned exactly opposite the recording device (or the reading device) carried by the plate and the read-out system composed of the memory devices. This occurs regardless of the clearance or the mechanical imperfections of the conveyor.

In a general manner the above description has been described only in an explanatory but by no means limitative manner, and the invention may undergo various changes in detail in conformity with its spirit.

We claim:
1. Numerical read-out system for a moving body having a group of mechanical memory devices placed side by side, a reading station, and a recording station, without material contact, comprising:
  blocks constituting the memory devices connected to the moving body,
  a conduit hollowed inside each block, the said conduit presenting two downwardly directed branches,
  and a movable mass capable of being transferred from one branch to the other, the recording station operating said transfer,
whereby the immobilization of said mass in one or the other branch corresponds to a stable position to which is attributed a binary numerical signification.

2. Numerical read-out system according to claim 1 in which the blocks are made of a material permitting the visual determination of the position of the movable masses.

3. Numerical read-out system according to claim 1 in which the inner conduit of each block constituting a mechanical memory device has the shape of an inverted U the horizontal part of which serves for the transfer of the movable mass from one branch of said U to the other.

4. Numerical read-out system according to claim 3 in which the movable mass is metallic and the recording device comprises a permanent magnet with an advancing and withdrawing movement and a lowering and raising movement, in such a way that said magnet transfers the metallic movable mass from one branch to the other of the U.

5. Numerical read-out system according to claim 4 in which the recorder comprises:
  a driving pinion with two possible directions of rotation,
  an arm carrying said permanent magnet,
  a rack mounted on said arm and in engagement with said driving pinion,
  a return spring,
  and a side electro-magnet capable of attracting said arm in opposition to said return spring.

6. Numerical read-out system according to claim 1 in which the inner conduit of each block constituting a mechanical memory device has the shape of an inverted V, the ridge of said V having to be cleared for the transfer of the movable mass from one branch of said V to the other.

7. Numerical read-out system according to claim 6 in which the inverted V conduit rests on one side so that one of the V branches is longer than the other.

8. Numerical read-out system according to claim 6 in which the movable mass is metallic and the recorder is an electromagnet placed above the memory device.

9. Numerical read-out system accordance to claim 6 in which the resetting to zero is realized by means of a permanent magnet placed above the point of origin of the branches of the inverted V.

10. Numerical read-out system according to claim 1 in which the movable mass is a ball.

11. Numerical read-out system according to claim 1 in which the movable mass is a roller.

12. Numerical read-out system according to claim 11 in which the roller is hollowed on its side surface so as to bear only on its ends.

13. Numerical read-out system according to claim 1 in which a device with a stabilizing support is provided at each recording station and at each reading station.

14. Numerical read-out system according to claim 13 in which the device with a stabilizing support comprises:
  a fixed part,
  two positioning rollers,
  a plate hinged on said fixed part and supporting the station in question, and said rollers,
  a double incline in engagement with the rollers and integral with the movable group of memory devices.

References Cited

UNITED STATES PATENTS

| 3,013,445 | 12/1961 | Enssle | 74—568 |
| 3,103,824 | 9/1963 | Grumann | 74—568 |
| 3,311,857 | 3/1967 | Alexandersson | 340—173 X |
| 3,210,757 | 10/1965 | Jacob | 340—373 |

FOREIGN PATENTS

| 900,947 | 1/1954 | Germany. |

BERNARD KONICK, Primary Examiner

J. F. BREIMAYER, Assistant Examiner

U.S. Cl. X.R.

40—28; 235—68, 123; 340—373